Aug. 27, 1929.  W. B. SMITH  1,725,887
GRIP FEED FOR GIN SAW FILING MACHINES
Filed Oct. 27, 1928  3 Sheets-Sheet 2

W. B. Smith Inventor
By C. A. Snow & Co.
Attorneys

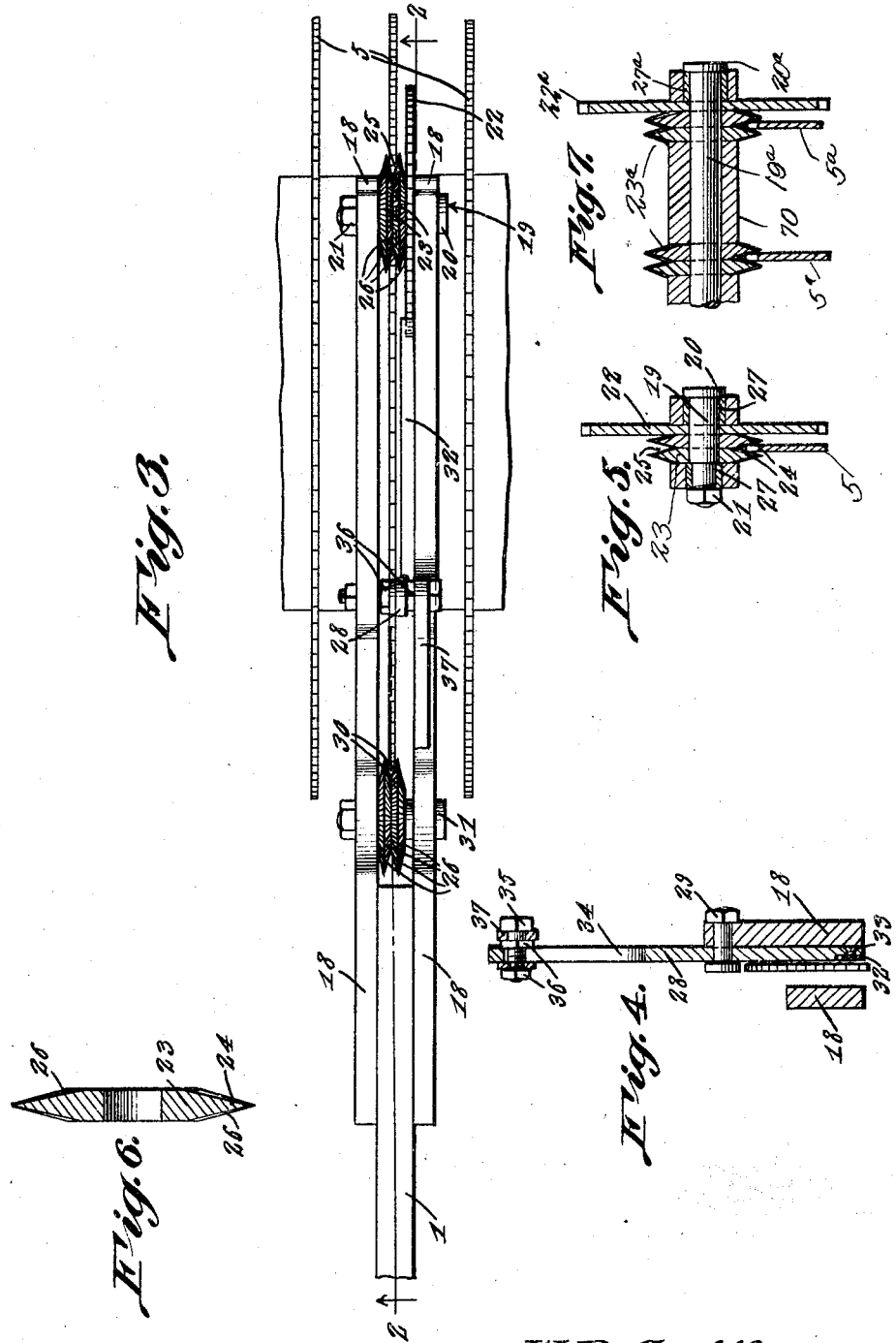

Patented Aug. 27, 1929.

1,725,887

UNITED STATES PATENT OFFICE.

WILLIAM BUNION SMITH, OF HARTSELLE, ALABAMA.

GRIP FEED FOR GIN-SAW-FILING MACHINES.

Application filed October 27, 1928. Serial No. 315,547.

The device forming the subject matter of this application is a machine for sharpening gin saws. Two specific improvements are proposed: to wit, novel means for imparting rotation to the gin saw, so that different parts of it can be presented to the sharpening instrumentalities; and novel means for supporting the framework that carries the driving machinery, the weight of the framework and the driving machinery being effective to hold the rotating means in engagement with the gin saw.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made without in the scope of what is claimed, without departing from the spirit of the invention.

In the accompanying drawings:

Figure 3 is a top plan of the structure shown in Figure 2;

Figure 4 is a cross section showing one of the levers;

Figure 5 is a section taken through the rotary member that drives the gin saw whilst the gin saw is being sharpened;

Figure 6 is a transverse section of one of the discs that go to make up the rotary member depicted in Figure 5.

Figure 7 is a sectional view showing a modification.

The device forming the subject matter of this application may be used on gin saw sharpeners of widely different sorts. By way of illustration, it will be shown and described in connection with the gin saw sharpening and gumming device on which John J. Smith, of McDonough, Georgia, received Letters Patent 1,304,614, on the 27th day of May, 1919. In view of the fact that the invention is applied to an old and known machine, the fore part of this description may be reduced almost to a catalogue, notice being given where the description of that which is old ceases, and the description of that which is new begins.

Figure 1:
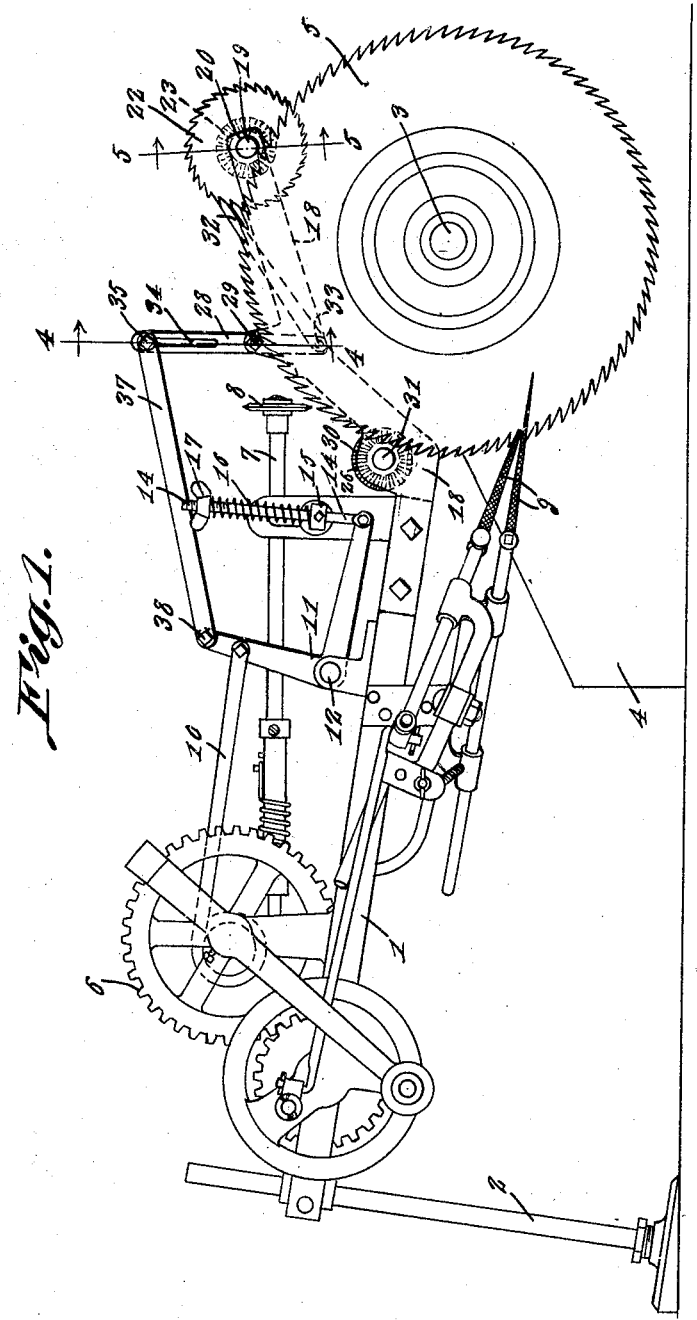
Figure 1 shows in side elevation, a device constructed in accordance with the invention, embodied in a known form of gin saw sharpener.

In the drawings, and in Figure 1 especially, there is shown a gin saw sharpener and gummer embodying a frame 1 supported at one end on a post 2. The numeral 3 marks a mandrel, supported for rotation at 4, and carrying the gin saw 5 which is to be sharpened.

On the frame 1 there is mounted a gearing 6 driving a shaft 7 which carries the gumming wheel 8. The files 9 that do the sharpening are driven from the gearing 6. A pitman 10 is worked off the gearing 6 by an eccentric and strap. A bell crank lever 11 is fulcrumed at 12 on the frame 1. The pitman 10 is pivoted to one arm of the bell crank 11.

A rod 14 is pivoted to the arm of the bell crank and works up and down in a bearing 15 that is pivotally mounted on the frame 1. A compression spring 16 surrounds part of the rod 14, one end of the compression spring abutting against the bearing 15 and the other end of the compression spring abutting against an adjusting nut 17 threaded on the rod 14. The part 16 serves as a cushioning and return spring in the operation of the machine.

The parts hereinbefore described are shown, substantially, in Patent No. 1,304,614, and no novelty is claimed for them, saving in so far as they may enter into combination with parts hereinafter described. Those desiring more detailed knowledge of the structure alluded to, are referred to the patent under consideration.

In carrying out the present invention, spaced arms 18 are mounted on that end of the frame 1 which is remote from the post 2. The numeral 19 marks a shaft, such as a bolt, having a head 20 at one end, and a nut 21 at the other end. On the bolt or shaft 19 is mounted a pair of sleeves 27. One sleeve abuts at its outer end against the head 20 and the other sleeve abuts at its outer end against the nut 21.

Figure 2:
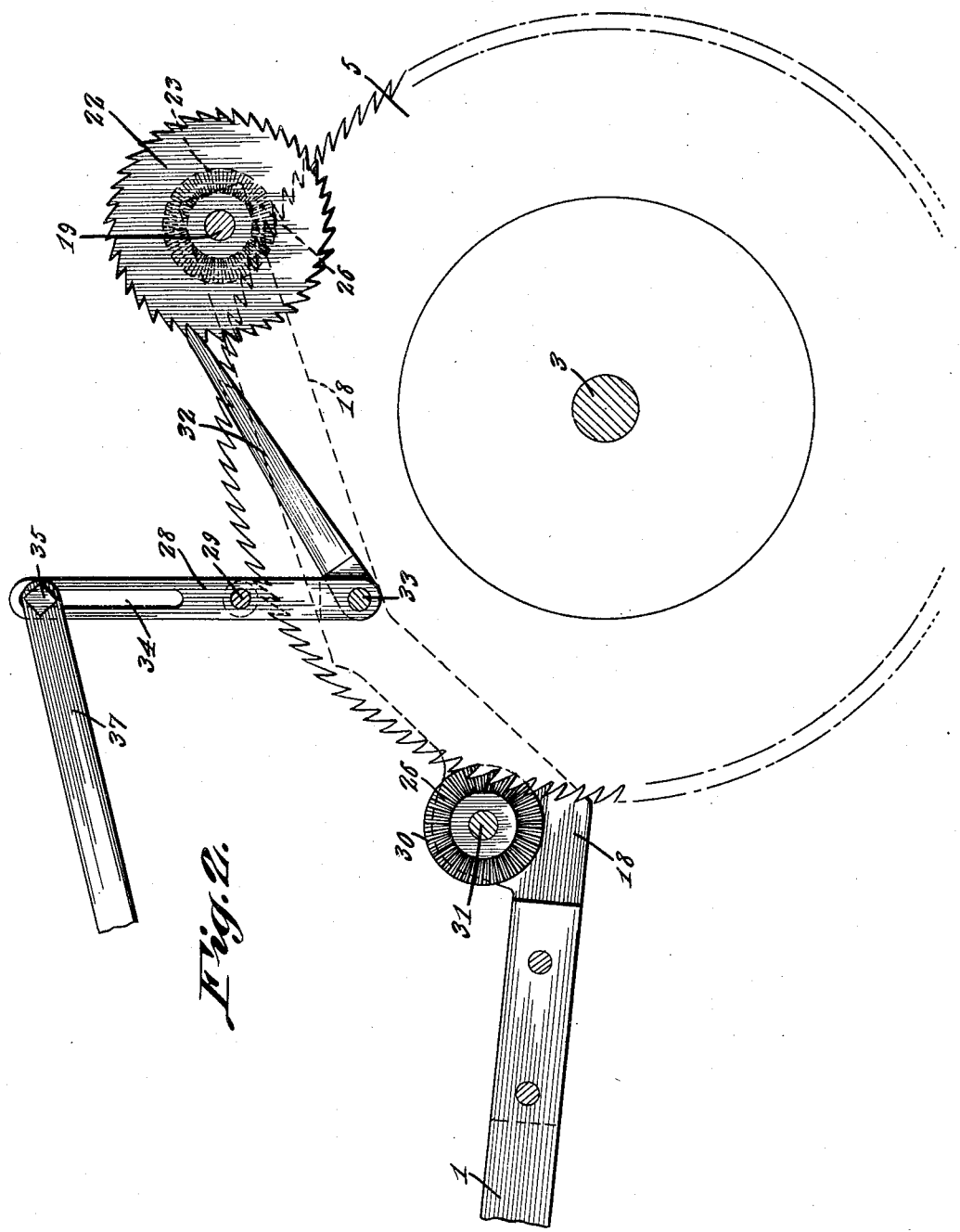
Figure 2 is a side elevation of the invention per se.

Between the inner ends of the sleeves 27, a pair of discs 23 and a ratchet wheel 22 are located, and by tightening up the nut 21, the ratchet wheel 22, and the discs 23, may be so clamped together that they will turn as one piece. The sleeves 27 are mounted for rotation in the arms 18 on the frame 1, and, thus, the discs 23 and the ratchet wheel 22 are journaled for rotation between the arms 18 as shown clearly in Figure 3 of the drawings. The discs 23 are thinned, as at 24, toward their peripheries. On each side, the discs 23 are roughened, as shown at 26. Preferably, the roughening consists of sharpening radial ribs, as disclosed in Figure 2 of the drawings. Since the discs 23 are bound tightly together by the nut 21 on the bolt 19, they form a rotatable member provided with a peripheral groove of V-shape, the walls of the groove being roughened.

The periphery of the saw 5 which is to be sharpened is received in the V-shaped throat 25 formed by the sloping or inclined surfaces of the discs 23. If the ratchet wheel 22 is rotated, the discs 23 will be rotated also, because the discs and the ratchet wheel are bound together to turn as one piece.

When the discs 23 are rotated, rotation will be imparted to the saw file which is received in the throat 25. The discs 23 form a very efficient means for imparting rotation to the saw 5, and this is so for three reasons, among others: first, because the throat 25 in which the edge of the saw 5 is received is V-shaped in cross section; second, because the walls of the throat 25 are roughened, as at 26; and third, because the weight of the frame 1 and the machinery on it, is carried, at one end of the frame, on the saw 5, chiefly by way of the discs 23. Another pair of discs 30 are located about 90 degrees remote from the disc 23 and are journaled on a shaft 31 carried by the arms 18. The discs 30 serve to steady the frame 1 on the saw 5, but practically all of the weight is carried by the discs 23 which turn on the ratchet wheel 22. In connection with all of the discs, such as the discs 23, it is to be observed that these discs have ribs 26 on both sides. When the ribs on the walls of the throat 25 become worn, the discs 23 can be shifted about, so as to bring a new set of rib surfaces into use.

A lever 28 is fulcrumed intermediate its ends at 29 on the arms 18 of the frame 1. A pawl 32 cooperates with the ratchet wheel 22 to impart rotation to the ratchet wheel. The pawl 32 is pivoted at 33 to the lower end of the lever 28.

The lever 28 is provided at its upper end with an elongated slot 34 in which a pivoted element 35 is clamped by nuts 36, the construction being such that the pivot element 38 can be adjusted along the slot 34 to vary the throw of the pawl 32. The pivot element 35 is mounted in a link 37 which is pivoted at 38 to one arm of the bell crank lever 11.

The operation of the device, and its advantages have been dealt with step by step hereinbefore, and no more than a brief résumé is required at this place.

The gearing 6 operates the pitman 10 and tilting movement is imparted to the bell crank lever 11. The bell crank lever 11 moves the link 37, and, thus, the lever 28 is tilted, the pawl 32 cooperating with the ratchet wheel 22 to rotate the discs 23, the discs imparting rotation to the saw 5, because the saw 5 at its periphery is received in the throat 25, the weight of the machine aiding to hold down the discs 23 on the saw 5. As the saw 5 is turned, it is shifted, a tooth at a time with respect to the gumming wheel 8 and the sharpening files 9, or their equivalent.

In Figure 7 of the drawings, parts hereinbefore described have been designated by numerals previously used with the suffix "a". This view shows that there may be as many pairs of disks 23ª, and corresponding parts, as the operator desires, this being a matter of mere duplication.

What is claimed is:

1. In a machine for sharpening gin saws, a frame, a rotatable feeding member journaled on the frame and having a circumferential groove in which the edge of the saw is received, thereby to support the frame on the saw and to make part of the weight of the frame effective as a means for holding the rotatable feeding member in engagement with the saw, and means for imparting rotation to the rotatable member.

2. In a device of the class described, a frame, a rotatable feeding member journaled on the frame, and means for rotating the rotatable feeding member, the rotatable feeding member comprising a pair of reversible discs and means for holding the discs together, the discs being thinned toward their edges to define a groove for the reception of the edge of a gin saw, and both the inner and outer surfaces of the disc being roughened.

3. In a machine for sharpening gin saws, a frame, a rotatable feeding member journaled on the frame, and means for rotating the rotatable feeding member, the rotatable feeding member comprising a pair of discs and means for clamping the discs together, the discs being thinned at their peripheries to define a V-shaped groove for the reception of the periphery of a gin saw.

4. In a machine for sharpening gin saws, a frame, a rotatable feeding member journaled on the frame, the rotatable feeding member comprising a ratchet wheel and a pair of discs, and means for clamping the discs and the ratchet wheel together, the discs being thinned at their peripheries to define a circumferential groove for the reception of the edge of a gin saw, a pawl cooperating with the ratchet wheel and means for actuating the pawl, thereby to impart rotation to the ratchet wheel and to the discs.

In testimony that I claim the foregoing as my own, I have hereto affixed my signature.

WILLIAM $\overset{\text{his}}{\times}$ BUNION SMITH.
mark